US012018749B2

(12) United States Patent
Murazumi et al.

(10) Patent No.: US 12,018,749 B2
(45) Date of Patent: Jun. 25, 2024

(54) VEHICLE CONTROL DEVICE

(71) Applicants: JATCO Ltd, Fuji (JP); NISSAN MOTOR CO., LTD., Yokohama (JP)

(72) Inventors: Tarou Murazumi, Atsugi (JP); Hajime Tasaka, Ebina (JP); Keisuke Iwado, Ebina (JP); Hiroyuki Tokoi, Isehara (JP); Yuji Oishi, Sagamihara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/548,172

(22) PCT Filed: Feb. 25, 2022

(86) PCT No.: PCT/JP2022/007964
§ 371 (c)(1),
(2) Date: Aug. 28, 2023

(87) PCT Pub. No.: WO2022/186080
PCT Pub. Date: Sep. 9, 2022

(65) Prior Publication Data
US 2024/0141985 A1 May 2, 2024

(30) Foreign Application Priority Data
Mar. 5, 2021 (JP) ................................. 2021-035859

(51) Int. Cl.
*F16H 61/12* (2010.01)
*B60W 10/02* (2006.01)
(Continued)

(52) U.S. Cl.
CPC ............. *F16H 61/12* (2013.01); *B60W 10/02* (2013.01); *B60W 10/06* (2013.01);
(Continued)

(58) Field of Classification Search
CPC ................... F16H 61/12; F16H 63/50; F16H 2061/1256; B60W 10/02; B60W 10/06;
(Continued)

(56) References Cited

U.S. PATENT DOCUMENTS

2013/0151109 A1* 6/2013 Waku .............. B60W 30/18018
701/99
2018/0297465 A1* 10/2018 Miyaishi ................. F16H 61/36
(Continued)

FOREIGN PATENT DOCUMENTS

JP 2020-066369 A 4/2020

*Primary Examiner* — Edwin A Young
(74) *Attorney, Agent, or Firm* — Foley & Lardner LLP

(57) ABSTRACT

In a vehicle control device for controlling the vehicle, when automatic downshift control for automatically downshifting a speed ratio of the transmission is executed in the case where a drive current value of the motor obtained when the second oil pump is driven is larger than a maximum value of the drive current value of the motor obtained when the second oil pump is driven in a normal drive state, the vehicle control device increases a minimum rotation speed of the drive source compared to a case where the drive current value of the motor is equal to or less than the maximum value, and when the automatic downshift control is executed in the case where a line pressure generated by a hydraulic pressure supplied from the first oil pump and the second oil pump is larger than a predetermined value, the vehicle control device does not increase the minimum rotation speed of the drive source even in the case where the drive current value of the motor obtained when the second oil pump is driven is larger than the maximum value.

3 Claims, 5 Drawing Sheets

(51) Int. Cl.
  *B60W 10/06* (2006.01)
  *B60W 30/18* (2012.01)
  *F16H 63/50* (2006.01)
(52) U.S. Cl.
  CPC ....... *B60W 30/18072* (2013.01); *F16H 63/50* (2013.01); *B60W 2030/1809* (2013.01); *B60W 2510/108* (2013.01); *B60W 2710/021* (2013.01); *B60W 2710/0644* (2013.01); *F16H 2061/1256* (2013.01)
(58) Field of Classification Search
  CPC ............... B60W 30/18072; B60W 2030/1809; B60W 2510/108; B60W 2710/021; B60W 2710/0644
  See application file for complete search history.

(56) References Cited

U.S. PATENT DOCUMENTS

| | | |
|---|---|---|
| 2020/0132059 A1 | 4/2020 | Ikemoto et al. |
| 2020/0165987 A1* | 5/2020 | Cunningham ........ B60W 20/00 |

* cited by examiner

VEHICLE CONTROL DEVICE

TECHNICAL FIELD

The present invention relates to a vehicle control device, a vehicle control method, and a computer-executable program for controlling a vehicle.

BACKGROUND ART

Patent Document 1 discloses a hybrid vehicle including an engine, two drive motors, a mechanical oil pump that is rotated together with the rotation of the engine and discharges hydraulic oil used in a power transmission device, and an electric oil pump that is rotated by a motor dedicated to oil pump and discharges hydraulic oil.

In the hybrid vehicle of Patent Document 1, when the hybrid vehicle is traveling in a motor traveling mode and the electric oil pump is in a state of insufficient performance due to a failure, traveling by the two drive motors is prohibited, the vehicle is traveled by one drive motor, and the mechanical oil pump is rotated by the other drive motor. As a result, in the hybrid vehicle described in Patent Document 1, even when the electric oil pump is in a state of insufficient performance due to a failure, it is possible to appropriately secure a required flow rate of the hydraulic oil in the power transmission device.

PRIOR ART DOCUMENT

Patent Document

Patent Document 1: JP 2020-66369 A

SUMMARY OF INVENTION

An electric oil pump driven by a motor has a lower maximum discharge pressure than a mechanical oil pump driven by an engine. For this reason, for example, when a line pressure is high, the electric oil pump cannot discharge hydraulic oil, and thus a failure may be determined.

If it is determined that the electric oil pump has failed in this manner, the driving of the electric oil pump is stopped and the hydraulic oil is supplied only by the mechanical oil pump, which may deteriorate the fuel consumption.

The present invention has been made in view of such problems, and an object thereof is to prevent erroneous determination related to abnormality determination of an electric oil pump and prevent deterioration of fuel consumption.

A vehicle according to one aspect of the present invention includes transmission which have first oil pump driven by rotation of a drive source that drives a drive wheel and a second oil pump driven by a motor. In a vehicle control device for controlling the vehicle, when automatic downshift control for automatically downshifting a speed ratio of the transmission is executed in the case where a drive current value of the motor obtained when the second oil pump is driven is larger than a maximum value of the drive current value of the motor obtained when the second oil pump is driven in a normal drive state, the vehicle control device increases a minimum rotation speed of the drive source compared to a case where the drive current value of the motor is equal to or less than the maximum value, and when the automatic downshift control is executed in the case where a line pressure generated by a hydraulic pressure supplied from the first oil pump and the second oil pump is larger than a predetermined value, the vehicle control device does not increase the minimum rotation speed of the drive source even in the case where the drive current value of the motor obtained when the second oil pump is driven is larger than the maximum value.

A vehicle according to another aspect of the present invention includes transmission which have first oil pump driven by rotation of a drive source that drives a drive wheel and a second oil pump driven by a motor. In a vehicle control device for controlling the vehicle, in the case where a drive current value of the motor obtained when the second oil pump is driven is larger than a maximum value of the drive current value of the motor obtained when the second oil pump is driven in a normal drive state, the vehicle control device does not execute idle reduction control for automatically stopping the drive source when the vehicle is stopped, and in the case where a line pressure generated by a hydraulic pressure supplied from the first oil pump and the second oil pump is larger than a predetermined value, the vehicle control device executes the idle reduction control even in the case where the drive current value of the motor obtained when the second oil pump is driven is larger than the maximum value.

A vehicle according to another aspect of the present invention includes transmission which have first oil pump driven by rotation of a drive source that drives a drive wheel and a second oil pump driven by a motor. In a vehicle control device for controlling the vehicle, in the case where a drive current value of the motor obtained when the second oil pump is driven is larger than a maximum value of the drive current value of the motor obtained when the second oil pump is driven in a normal drive state, the vehicle control device does not execute coast stop control for automatically stopping the drive source when the vehicle is traveling and for cutting off power transmission between the drive source and the drive wheel, and in the case where a line pressure generated by a hydraulic pressure supplied from the first oil pump and the second oil pump is larger than a predetermined value, the vehicle control device executes the coast stop control even in the case where the drive current value of the motor obtained when the second oil pump is driven is larger than the maximum value.

According to these aspects, it is possible to prevent erroneous determination related to abnormality determination of the electric oil pump and prevent deterioration of fuel consumption.

DESCRIPTION OF EMBODIMENTS

Hereinafter, embodiments of the present invention will be described with reference to the accompanying drawings.

Figure 1:
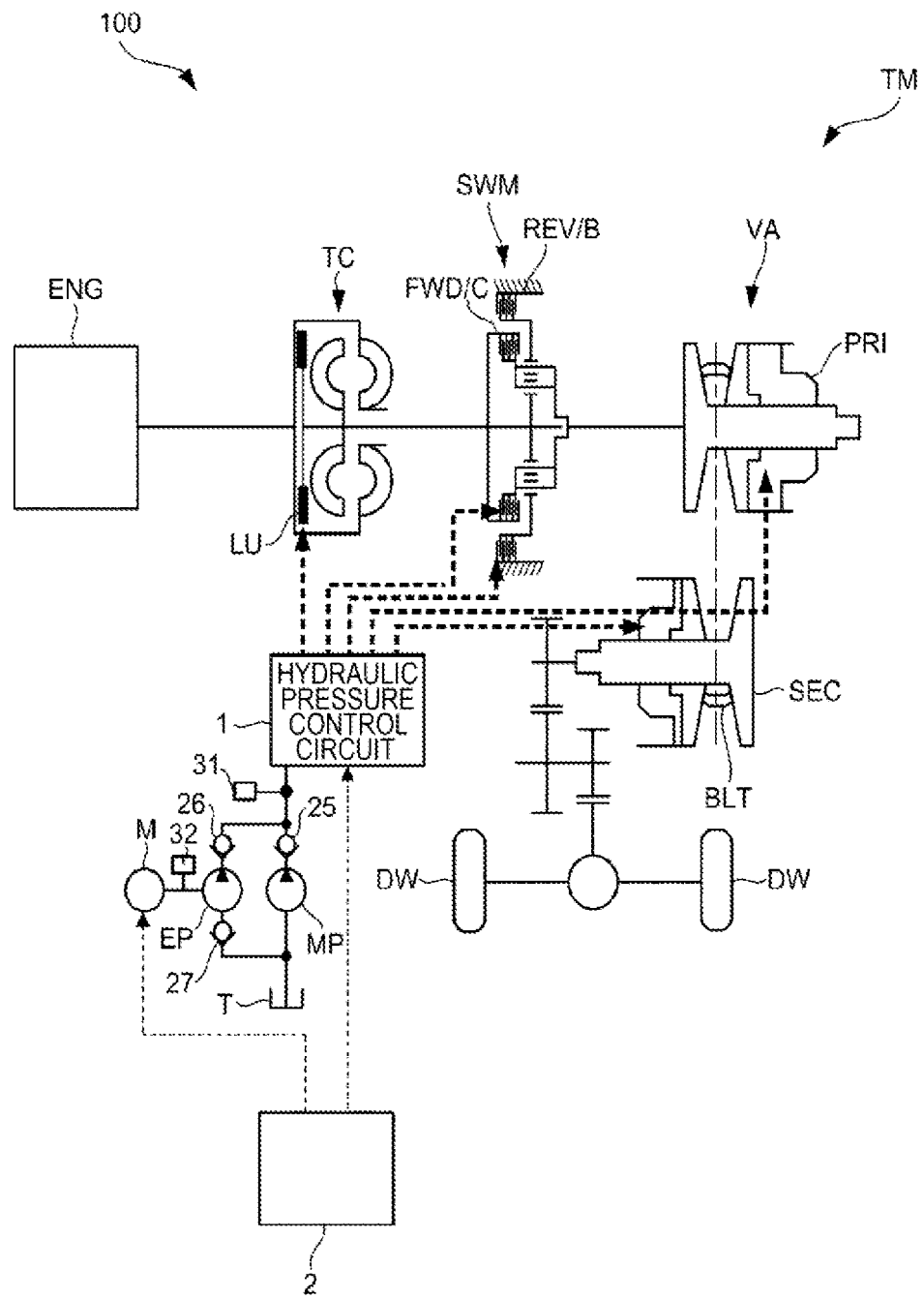
FIG. 1 is a schematic configuration diagram of a vehicle on which a hydraulic pressure control circuit for a transmission according to the present embodiment is mounted.

FIG. 1 is a schematic configuration diagram of a vehicle 100. The vehicle 100 includes an engine ENG, a torque converter TC, a forward/reverse switching mechanism SWM, and a variator VA. In the vehicle 100, a transmission TM is a belt continuously variable transmission including the torque converter TC, the forward/reverse switching mechanism SWM, and the variator VA.

The engine ENG constitutes a drive source of the vehicle 100. The engine ENG is, for example, a gasoline engine. The power of the engine ENG is transmitted to drive wheels DW via the torque converter TC, the forward/reverse switching mechanism SWM, and the variator VA. In other words, the torque converter TC, the forward/reverse switching mechanism SWM, and the variator VA are provided in a power transmission path connecting the engine ENG and the drive wheels DW.

The torque converter TC transmits power through a fluid. In the torque converter TC, the power transmission efficiency is enhanced by engaging a lock-up clutch LU.

The forward/reverse switching mechanism SWM is provided in a power transmission path connecting the engine ENG and the variator VA. The forward/reverse switching mechanism SWM switches forward/reverse of the vehicle 100 by switching a rotation direction of input rotation. The forward/reverse switching mechanism SWM includes a forward clutch FWD/C that is engaged when a forward range (D) is selected, and a reverse brake REV/B that is engaged when a reverse (R) range is selected. When the forward clutch FWD/C and the reverse brake REV/B are disengaged, the transmission TM is in a neutral state, that is, a power cutoff state.

The variator VA constitutes a belt continuously variable transmission mechanism including a primary pulley PRI, a secondary pulley SEC, and a belt BLT wound around the primary pulley PRI and the secondary pulley SEC. A primary pulley pressure Ppri, which is a hydraulic pressure for driving the primary pulley PRI, is supplied to the primary pulley PRI from a hydraulic pressure control circuit 1 to be described later, and a secondary pulley pressure Psec, which is a hydraulic pressure for driving the secondary pulley SEC, is supplied to the secondary pulley SEC from the hydraulic pressure control circuit 1.

The transmission TM further includes a mechanical oil pump MP, an electric oil pump EP, a motor M, the hydraulic pressure control circuit 1, a check valve 25, and a check valve 26. The mechanical oil pump MP supplies hydraulic oil suctioned from an oil pan T to the hydraulic pressure control circuit 1. The mechanical oil pump MP is driven by the power of the engine ENG. The electric oil pump EP is driven by the power of the motor M. The electric oil pump EP supplies hydraulic oil suctioned from the oil pan T to the hydraulic pressure control circuit 1 together with or independently of the mechanical oil pump MP. The electric oil pump EP is auxiliary to the mechanical oil pump MP. The electric oil pump EP includes the motor M.

The hydraulic pressure control circuit 1 includes a plurality of flow paths and a plurality of hydraulic pressure control valves, regulates the pressure of the hydraulic oil supplied from the mechanical oil pump MP or the electric oil pump EP, and supplies the hydraulic oil to each part of the transmission TM.

Operations of the engine ENG and the transmission TM are controlled by a controller 2 as a control device. The controller 2 includes an engine controller (not shown) and a transmission controller (not shown). The engine controller and the transmission controller are implemented with an electronic control unit, and include a microcomputer including a central processing unit (CPU), various storage devices such as a RAM and a ROM, an input/output interface, and the like. The engine controller and the transmission controller are communicably connected to each other via a CAN standard bus. The controller 2 performs various processes by the CPU reading and executing various programs stored in the ROM or the like. The various programs executed by the controller 2 may be stored in a non-transitory storage medium such as a CD-ROM.

The controller 2 (engine controller) receives a detection signal of an operation state sensor that detects an operation state of the engine ENG, executes a predetermined calculation based on the operation state, and sets a fuel injection amount, a fuel injection timing, an ignition timing, and the like of the engine ENG. A rotation speed, a torque, and the like of the engine ENG are controlled based on commands from the controller 2 (engine controller). As the operation state sensor, an accelerator sensor that detects an operation amount of an accelerator pedal (hereinafter, referred to as "accelerator position" (accelerator opening degree)) by a driver, a rotation speed sensor that detects a rotation speed Ve of the engine ENG, a cooling water temperature sensor that detects the temperature of an engine cooling water, and the like are provided.

The controller 2 (transmission controller) receives detection signals from various sensors that detect an operation state of the transmission TM, and controls operations of the hydraulic pressure control circuit 1 and the electric oil pump EP based on the signals. The hydraulic pressure control circuit 1 performs hydraulic pressure control of the lock-up clutch LU, the forward clutch FWD/C, the reverse brake REV/B, the primary pulley PRI, the secondary pulley SEC, and the like based on instructions from the controller 2.

The check valve 25 allows the flow of the hydraulic oil from the mechanical oil pump MP toward the hydraulic pressure control circuit 1, and blocks the flow of the hydraulic oil from the hydraulic pressure control circuit 1 toward the mechanical oil pump MP. This prevents a line pressure PL from acting on the mechanical oil pump MP when the mechanical oil pump MP is stopped.

The check valve 26 allows the flow of the hydraulic oil from the electric oil pump EP toward the hydraulic pressure control circuit 1, and blocks the flow of the hydraulic oil from the hydraulic pressure control circuit 1 toward the electric oil pump EP. This prevents the electric oil pump EP from rotating in the reverse direction due to the line pressure PL acting on the electric oil pump EP when the electric oil pump EP is stopped.

A check valve 27 is provided between the electric oil pump EP and the oil pan T. The check valve 27 prevents the hydraulic oil from returning to the oil pan T from flow paths inside and on a suction side of the electric oil pump EP when the electric oil pump EP is stopped. As a result, it is possible to prevent air from entering the electric oil pump EP, in other words, prevent the electric oil pump EP from being insufficient in suction of the hydraulic oil, and to prevent a delay in the rise of a hydraulic pressure when the electric oil pump EP is operated.

Next, operation modes of the mechanical oil pump MP and the electric oil pump EP will be described.

The controller 2 switches the operation modes of the mechanical oil pump MP and the electric oil pump EP according to a driving state of the vehicle 100. In the present embodiment, the operation modes include an MP mode in which only the mechanical oil pump MP is driven by the engine ENG, an EP mode in which only the electric oil pump EP is driven, and a TDP mode in which the mechanical oil pump MP and the electric oil pump EP are driven.

The MP mode is selected when the rotation speed Ve of the engine ENG is high. Specifically, the MP mode is selected when a flow rate (hereinafter, referred to as a "required flow rate") required by hydraulic equipment mounted on the vehicle 100 can be provided by a discharge flow rate discharged by the mechanical oil pump MP. The discharge flow rate of the mechanical oil pump MP is proportional to the rotation speed Ve of the engine ENG. Therefore, when the rotation speed Ve of the engine ENG is high, the required flow rate can be provided by only the power of the engine ENG, that is, the discharge flow rate based on the mechanical oil pump MP. In the MP mode, the electric oil pump EP is kept stopped.

The EP mode is selected when the engine ENG is stopped. When idle reduction control, coast stop control, or the like is being executed, the rotation of the engine ENG is stopped, and thus the rotation of the mechanical oil pump MP is also stopped. Therefore, when the rotation of the engine ENG is stopped, the controller 2 drives the motor M to drive the electric oil pump EP. As a result, the required flow rate can be provided by a discharge flow rate based on the electric oil pump EP.

The TDP mode is selected when the required flow rate cannot be provided by the discharge flow rate based only on the power of the engine ENG, specifically, when the rotation speed Ve of the engine ENG is low. As described above, when only the engine ENG is driven, the discharge flow rate of mechanical oil pump MP is proportional to the rotation speed Ve of the engine ENG. Therefore, when the rotation speed Ve of the engine ENG is low, the required flow rate cannot be provided by the discharge flow rate based only on the mechanical oil pump MP. Therefore, the controller 2 drives the motor M to drive the electric oil pump EP. As a result, the required flow rate which is insufficient only with the discharge flow rate based only on the mechanical oil pump MP can be provided by the discharge flow rate based on the electric oil pump EP.

Here, a specific situation in which the electric oil pump EP operates will be described.

In the present embodiment, the electric oil pump EP is driven when automatic downshift control, kick-down control, idle reduction control, coast stop control, and the like are executed.

The automatic downshift control is control for automatically downshifting a speed ratio of the transmission TM. Specifically, the automatic downshift control is that, for example, when the vehicle 100 decelerates, the speed ratio of the variator VA is returned to a lowest speed ratio immediately before the vehicle 100 stops to ensure the startability after the vehicle 100 is stopped (hereinafter, returning the speed ratio of the variator VA to the lowest speed ratio is also referred to as "low returning").

The low returning is shift control in which the speed ratio of the variator VA is changed to a low speed ratio, that is, in a direction in which the speed ratio increases according to a decrease in a vehicle speed V, and is performed by downshifting the variator VA in accordance with a shift line (not shown) during coast traveling (a state in which the vehicle 100 is traveling without fuel being supplied to the engine ENG) including coast stop control to be described later.

When the vehicle 100 suddenly decelerates, the secondary pulley SEC is going to stop due to a braking force of the brake. On the other hand, an inertial force of the engine ENG, the torque converter TC, and the like acts on the primary pulley PRI. When the inertial force is large, a clamping force may be insufficient and belt slip may occur. Therefore, the controller 2 quickly increases the line pressure PL to increase the secondary pulley pressure Psec. At this time, since the rotation speed Ve of the engine ENG decreases, the flow rate of the hydraulic oil supplied from the mechanical oil pump MP decreases. Therefore, in such a situation, the controller 2 operates the electric oil pump EP to quickly increase the line pressure PL so as to increase the secondary pulley pressure Psec, thereby preventing belt slip. When the vehicle 100 suddenly decelerates in this manner, the low returning is performed while increasing the secondary pulley pressure Psec, and thus the required flow rate increases. Therefore, a rotation speed of the electric oil pump EP increases.

The electric oil pump EP is also driven during the kick-down control. The kick-down control is shift control for accelerating the vehicle 100 by significantly downshifting from a current speed ratio to a low speed ratio when a driver suddenly depresses the accelerator pedal. When the kick-down control is executed, a high shift rate is required, and thus the required flow rate increases. Therefore, since the flow rate of the hydraulic oil supplied from the mechanical oil pump MP cannot satisfy the required flow rate, the electric oil pump EP is driven.

The coast stop control is control for suppressing the fuel consumption by automatically stopping the engine ENG to reduce the deceleration due to the friction of the engine ENG and delaying the timing of fuel cut recovery (restart of fuel supply to the engine ENG) due to a decrease in the vehicle speed while the vehicle 100 is coasting, and specifically, the coast stop control is that, when an accelerator is off during traveling, the fuel supply to the engine ENG is stopped, and the power transmission between the engine ENG and the drive wheels DW is cut off by disengaging the forward clutch FWD/C, so that the engine ENG is automatically stopped (the rotation of the engine ENG is stopped). The coasting by the fuel cut control executed when the accelerator is off is common in that the fuel supply to the engine ENG is stopped, but is different in that the power transmission path between the engine ENG and the drive wheels DW is cut off to stop the rotation of the engine ENG. In the fuel cut control executed during coasting when the accelerator is off, when the vehicle speed decreases and the rotation speed of the engine ENG driven by the drive wheels DW decreases, the lock-up clutch LU is disengaged and the fuel injection is restarted to maintain a self-sustaining state of the engine ENG.

In executing the coast stop control, the controller 2 first determines coast stop conditions (a) to (c) shown below.
 (a): foot is released from accelerator pedal (accelerator position APO=0)
 (b): brake pedal is depressed (brake depression force or brake pressure is equal to or greater than a predetermined value)
 (c): vehicle speed V is equal to or less than a predetermined low vehicle speed (for example, 10 km/h to 20 km/h) (predetermined vehicle speed Vv)

In other words, these conditions are conditions for determining whether the driver intends to stop the vehicle. The controller 2 determines that the coast stop conditions are satisfied when all of the conditions (a) to (c) are satisfied. In addition, conditions such as the remaining capacity of a battery (not shown) and the temperature of cooling water may be included.

The lock-up clutch LU is disengaged when the lock-up clutch LU crosses a lock-up release line (not shown) set on a shift map from a high-speed side or a high-speed rotation side to a low-speed side or a low-speed rotation side.

The idle reduction control is control for stopping idling of the engine ENG in the case where a predetermined condition is satisfied when the vehicle 100 is stopped. In executing the idle reduction control, the controller 2 first performs idle reduction conditions (d) to (f) shown below.

(d): foot is released from accelerator pedal (accelerator position APO=0)
(e): brake pedal is depressed (brake depression force or brake pressure is equal to or greater than a predetermined value)
(f): vehicle speed V is 0

In other words, these conditions are conditions for determining whether the driver intends to stop the vehicle. The controller 2 determines that the idle reduction conditions are satisfied when all of the conditions (d) to (f) are satisfied. In addition, conditions such as the remaining capacity of a battery (not shown) and the temperature of cooling water may be included.

Incidentally, when the line pressure PL is larger than a predetermined value PL1, it may not be possible to supply hydraulic oil even when the electric oil pump EP is driven. Specifically, for example, when the line pressure PL is larger than a pressure (maximum discharge pressure) that the electric oil pump EP can discharge, the hydraulic oil cannot be supplied even when a drive current value Im of the electric oil pump EP is set to a maximum value that can be supplied.

In such a situation, since the drive current value Im of the electric oil pump EP continues to be high, and in other words, since an actual rotation speed Vepr continues to deviate from an instructed rotation speed Vepi, the controller 2 determines that an abnormality has occurred in the electric oil pump EP (the electric oil pump EP has failed). When the electric oil pump EP has failed, the controller 2 stops the electric oil pump EP, and thereafter does not execute the control such as the idle reduction control or the coast stop control described above.

However, when the line pressure PL is larger than the predetermined value PL1, it is just that the performance of the electric oil pump EP is exceeded and the electric oil pump EP cannot be driven, and it does not mean that the electric oil pump EP has failed. Therefore, if it is determined that an abnormality has occurred in the electric oil pump EP in such a situation and the electric oil pump EP is stopped, the hydraulic oil is supplied only by the mechanical oil pump MP thereafter, and the fuel consumption may deteriorate.

Figure 2:
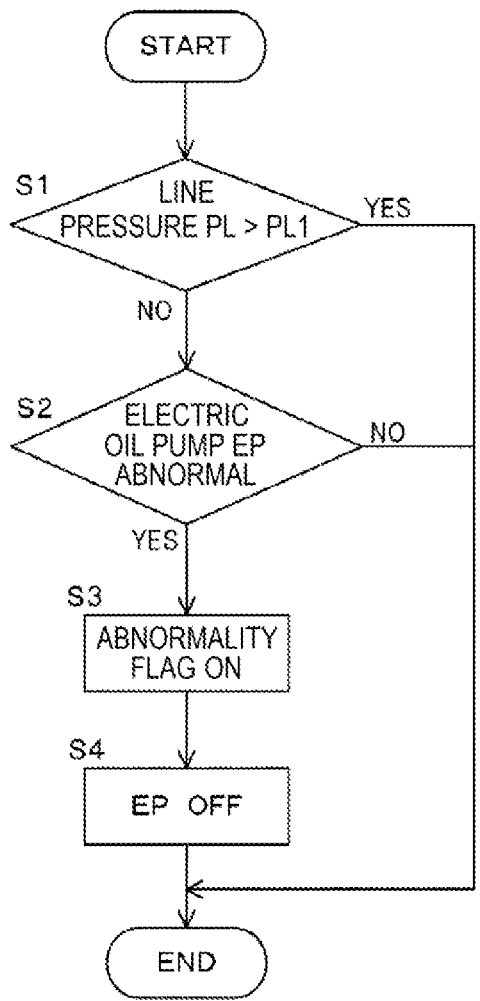
FIG. 2 is a flowchart showing a flow of control related to abnormality determination of an electric oil pump according to the present embodiment.

Therefore, in the present embodiment, when the line pressure PL is larger than the predetermined value PL1, an abnormality diagnosis of the electric oil pump EP is not performed to prevent erroneous determination related to the abnormality diagnosis of the electric oil pump EP. Hereinafter, control of the electric oil pump EP of the present embodiment will be specifically described with reference to FIGS. 2 to 7. FIG. 2 is a flowchart showing a flow of the control related to the abnormality diagnosis of the electric oil pump EP. The control of the electric oil pump EP described below is performed by executing a program stored in the controller 2 in advance.

In step S1, it is determined whether the line pressure PL is larger than the predetermined value PL1. Specifically, the controller 2 determines whether the line pressure PL detected by a line pressure sensor 31 (see FIG. 1) is larger than the predetermined value PL1. Here, the predetermined value PL1 will be described.

Figure 3:
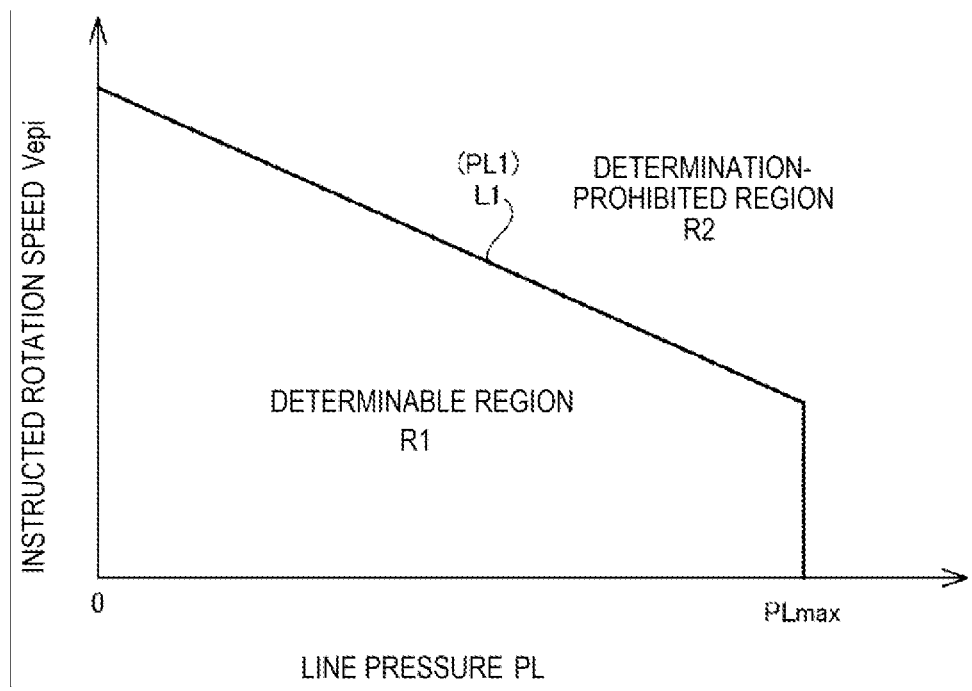
FIG. 3 is a diagram for illustrating an abnormality determination region of the electric oil pump according to the present embodiment.

In the present embodiment, the predetermined value PL1 is a threshold for determining whether to perform the abnormality diagnosis. Specifically, the predetermined value PL1 corresponds to a line segment L1 in FIG. 3, and is a value determined in advance according to each rotation speed Vep. A pressure PLmax in FIG. 3 is a maximum discharge pressure (an upper limit value of a dischargeable pressure) of the electric oil pump EP.

Even when the line pressure PL is equal to or less than the pressure PLmax, when the instructed rotation speed Vepi increases, the electric oil pump EP cannot supply the hydraulic oil (this situation cannot be achieved) due to a relation between the discharge pressure and the discharge flow rate even when the drive current value Im is increased to an upper limit value at which the drive current value Im can be supplied. Therefore, in the present embodiment, when an operating point is in a region R1 where the line pressure PL is equal to or less than the dischargeable pressure PLmax of the electric oil pump EP and the line pressure PL is equal to or less than rotation speeds that can be realized by line pressures PL, that is, in a region where the line pressure PL is equal to or less than the predetermined value PL1 (line pressures shown by the line segment L1), the controller 2 performs the abnormality diagnosis of the electric oil pump EP. On the other hand, when the operating point of the electric oil pump EP is not in the region R1, in other words, when the operating point is in a region R2 outside the region R1, since the electric oil pump EP may not be driven temporarily as described above, the controller 2 does not perform the abnormality diagnosis of the electric oil pump EP.

In step S1, when the controller 2 determines that the line pressure PL is larger than the predetermined value PL1, the process proceeds to END. That is, when the line pressure PL is larger than the predetermined value PL1, the controller 2 does not perform the abnormality diagnosis of the electric oil pump EP. On the other hand, when the controller 2 determines that the line pressure PL is equal to or less than the predetermined value PL1, the process proceeds to step S2.

In step S2, it is determined whether the electric oil pump EP is abnormal. The instructed rotation speed Vepi of the electric oil pump EP corresponds to an actual current value (drive current value Im) applied to the motor M. Therefore, in the present embodiment, as shown in FIG. 4A, it is determined whether the electric oil pump EP is abnormal based on a relation between the drive current value Im detected by a current sensor (not shown) and the actual rotation speed Vepr detected by a rotation speed sensor 32 (see FIG. 1).

Figure 4A:
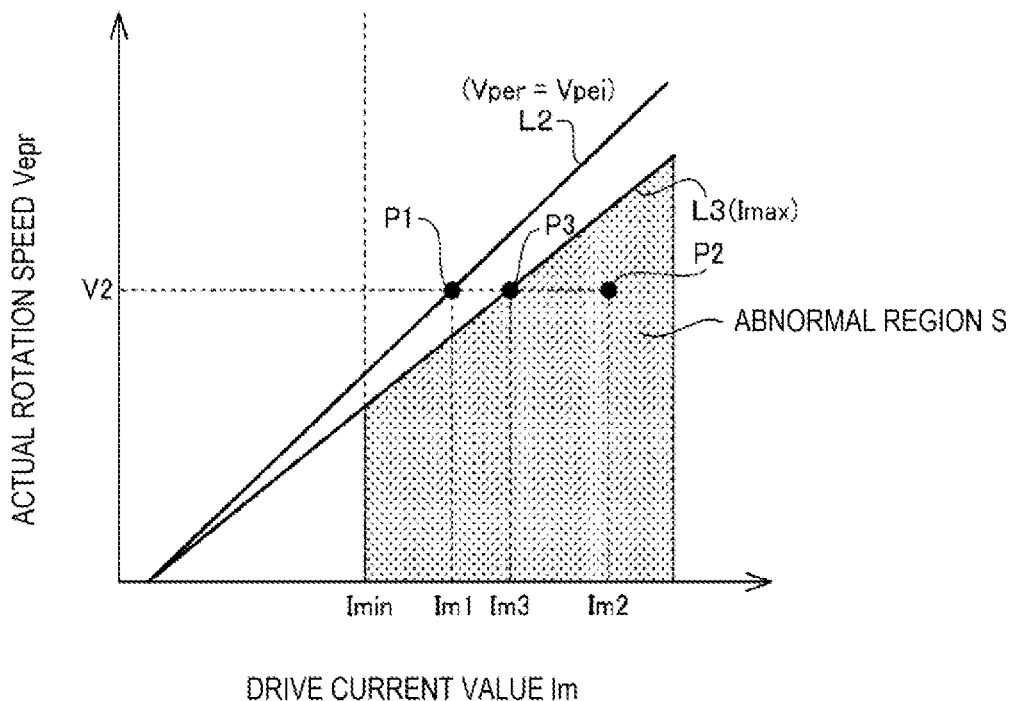
FIG. 4A is a diagram showing an abnormal region in a relation between a drive current value and an actual rotation speed according to the present embodiment.
Figure 4B:
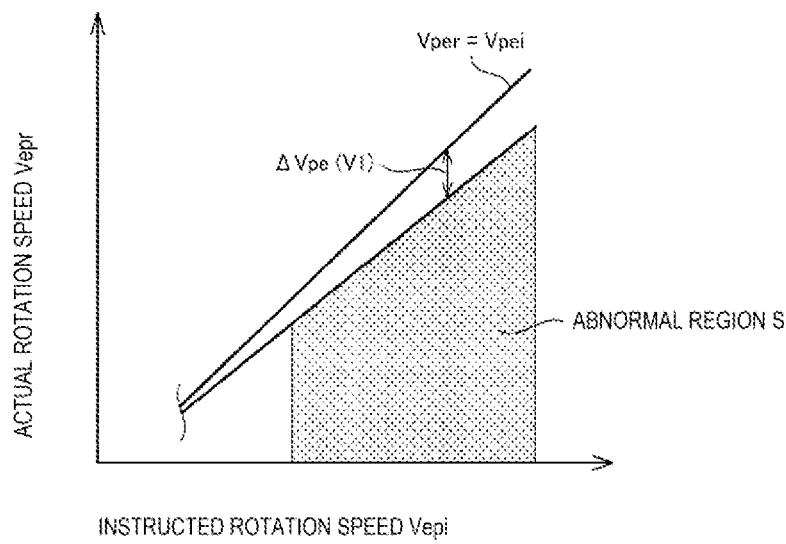
FIG. 4B is a diagram showing an abnormal region in a relation between an instructed rotation speed and the actual rotation speed according to the present embodiment.
Figure 5:
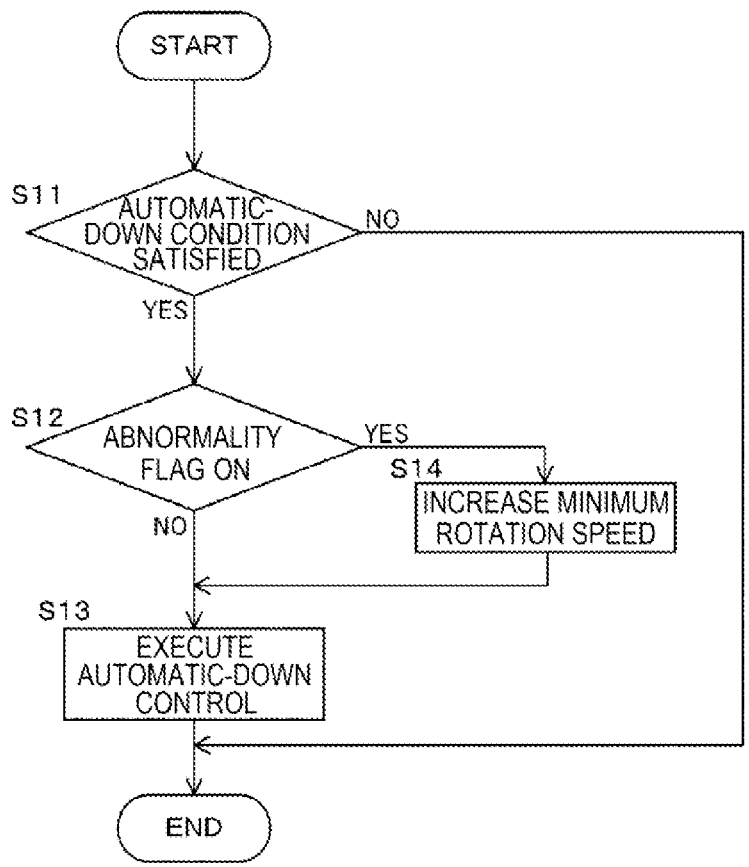
FIG. 5 is a flowchart of automatic downshift control.

As shown in FIG. 4A, when the electric oil pump EP is driven in a normal state, the drive current value Im of the motor M and the actual rotation speed Vepr of the electric oil pump EP have a relation as shown by a straight line L2. The normal state is a state in which the actual rotation speed Vevr of the electric oil pump EP is substantially equal to the instructed rotation speed Vepi and the elements including the electric oil pump EP and the motor M have no abnormality.

For example, when a foreign object or the like is caught in a sliding portion or the like of the electric oil pump EP and a rotation resistance is increased, the drive current value Im is larger than in the normal state. Therefore, in the present embodiment, when the electric oil pump EP is driven, if the drive current value Im of the motor M continues to be larger than an allowable maximum value Imax of the drive current value Im at the rotation speed Vepr for a predetermined time, it is determined that the electric oil pump EP is abnormal.

Specifically, the controller 2 determines whether the operating point (the rotation speed Vep of the electric oil pump EP and the drive current value Im of the motor M) of the electric oil pump EP is in an abnormal region S shown in FIG. 4A when the electric oil pump EP is driven. A straight line L3 shown in FIG. 4A is a line connecting allowable maximum values Imax of the drive current value Im (which can be determined to be normal) for actual rotation speeds Vper of the electric oil pump EP.

To explain the abnormality diagnosis with a specific example, for example, when the actual rotation speed Vper detected by the rotation speed sensor 32 is a speed V2, the drive current value Im is Im1 (point P1) in the normal state.

On the other hand, for example, when the actual rotation speed Vper is the speed V2 and the drive current value Im is Im2 (point P2) larger than an allowable maximum drive current value Im3 (point P3), the controller 2 determines that the electric oil pump EP is abnormal.

In the present embodiment, the abnormal region S is defined by the straight line L3 and a minimum value Imin of the drive current value Im of the motor M.

In step S2, when it is determined that the operating point of the electric oil pump EP is in the abnormal region S, the controller 2 determines that the electric oil pump EP is abnormal. When it is determined that the electric oil pump EP is abnormal, the process proceeds to step S3. On the other hand, when the operating point of the electric oil pump EP is not in the abnormal region S, the controller 2 determines that the electric oil pump EP has no abnormality and proceeds to END.

The abnormality of the electric oil pump EP can also be determined based on, for example, whether a rotation speed difference ΔVpe between the instructed rotation speed Vepi of the electric oil pump EP and the actual rotation speed Vepr has remained equal to or greater than a predetermined value V1 for a predetermined time T (about several seconds).

When the rotation speed difference ΔVpe (see FIG. 4B) between the instructed rotation speed Vepi and the actual rotation speed Vepr) has remained equal to or greater the predetermined value V1 for the predetermined time T (about several seconds), it can be considered that a foreign object or the like is caught in the sliding portion or the like of the electric oil pump EP and the rotation resistance is increased, or that some abnormality has occurred in the motor M, and thus it can be determined that the electric oil pump EP is abnormal. The predetermined value V1 is set to, for example, a value obtained by multiplying the instructed rotation speed Vepi by a predetermined coefficient α, or a fixed value.

In step S3, an abnormality flag is turned on. Specifically, the controller 2 turns on the abnormality flag. The abnormality flag is used for control to be described later.

In step S4, the electric oil pump EP is turned off. Specifically, thereafter, the controller 2 does not drive the electric oil pump EP even in a situation where the electric oil pump EP is to be driven. At this time, a warning may be issued to the driver or a maintenance worker.

Next, control when there is a drive request to the electric oil pump EP will be described.

As described above, the electric oil pump EP operates when the automatic downshift control, the kick-down control, the idle reduction control, and the coast stop control are executed. First, the automatic downshift control will be described with reference to FIG. 5.

In step S11, it is determined whether an automatic downshift condition is satisfied. Specifically, the controller 2 determines whether a low returning condition or an execution condition of the kick-down control is satisfied.

If it is determined in step S11 that the automatic downshift condition is satisfied, the process proceeds to step S12, and if it is determined in step S11 that the automatic-down condition is not satisfied, the process proceeds to END.

In step S12, it is determined whether the abnormality flag is ON or OFF. When the abnormality flag is OFF, the process proceeds to step S13, and the automatic downshift control is executed. On the other hand, when the abnormality flag is ON, the process proceeds to step S14.

In step S14, a minimum rotation speed Vemin of the engine ENG is increased. Specifically, the controller 2 controls the minimum rotation speed Vemin of the engine ENG to be increased by a predetermined rotation speed compared to the normal state (a state in which the drive current value Im of the motor M does not fall below the minimum value Imin). In other words, the controller 2 increases a lower limit value of the rotation speed Ve of the engine ENG by a predetermined rotation speed. The minimum rotation speed Vemin of the engine ENG is, for example, an idling rotation speed of the engine ENG.

In this manner, by increasing the minimum rotation speed Vemin of the engine ENG by a predetermined rotation speed, a minimum supply flow rate of the mechanical oil pump MP can be increased when the engine ENG is rotating at the minimum rotation speed Vemin (for example, idling rotation speed). As a result, even when the electric oil pump EP is stopped, the required flow rate of the hydraulic oil can be supplied only by the mechanical oil pump MP. The predetermined rotation speed to be increased is set in consideration of the discharge performance of the mechanical oil pump MP and the discharge performance of the electric oil pump EP.

After the minimum rotation speed Vemin of the engine ENG is set to be increased in step S14, the process proceeds to step S13, and the automatic downshift control is executed. In this case, since the electric oil pump EP is not driven, the required flow rate is supplied only by the mechanical oil pump MP.

Figure 6:
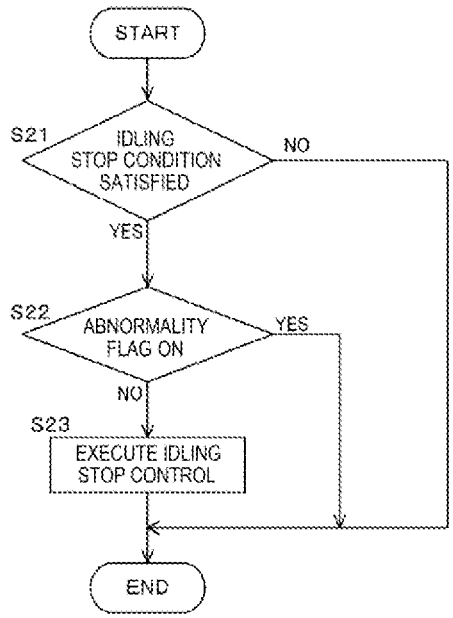
FIG. 6 is a flowchart of idle reduction control.

Next, the idle reduction control will be described with reference to FIG. 6.

In step S21, it is determined whether an idle reduction condition is satisfied. Specifically, the controller 2 determines whether the above execution conditions of the idle reduction control are satisfied.

If it is determined in step S21 that the idle reduction condition is satisfied, the process proceeds to step S22, and if it is determined in step S21 that the idle reduction condition is not satisfied, the process proceeds to END.

In step S22, it is determined whether the abnormality flag is ON or OFF. When the abnormality flag is OFF, the process proceeds to step S23, and the idle reduction control is executed. On the other hand, when the abnormality flag is ON, the process proceeds to END.

If the engine ENG is stopped in a state in which the hydraulic oil cannot be supplied from the electric oil pump EP, the hydraulic oil required by each element of the transmission TM cannot be supplied. Therefore, in the present embodiment, when it is determined that the abnormality flag is ON, that is, when it is determined that an operating state of the electric oil pump EP is in the abnormal region S, the idle reduction control is not executed. As a result, even when the vehicle 100 is stopped, the hydraulic oil required by the hydraulic pressure control circuit 1 can be supplied.

Figure 7:
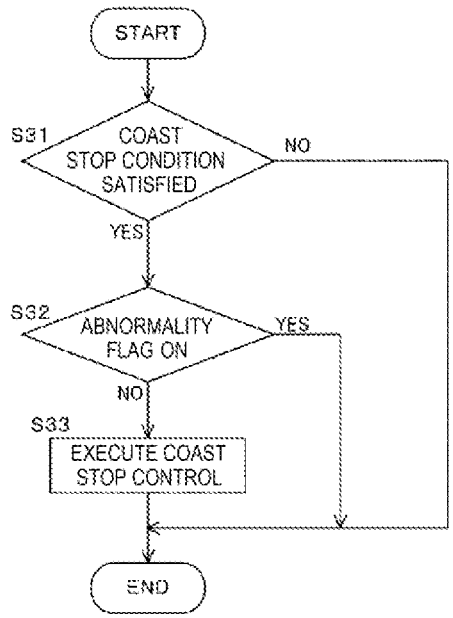
FIG. 7 is a flowchart of coast stop control.

Next, the coast stop control will be described with reference to FIG. 7.

In step S31, it is determined whether a coast stop condition is satisfied. Specifically, the controller 2 determines whether the above execution conditions of the coast stop control are satisfied.

If it is determined in step S31 that the coast stop condition is satisfied, the process proceeds to step S32, and if it is determined in step S31 that the coast stop condition is not satisfied, the process proceeds to END.

In step S32, it is determined whether the abnormality flag is ON or OFF. When the abnormality flag is OFF, the process proceeds to step S33, and the coast stop control is executed. On the other hand, when the abnormality flag is ON, the process proceeds to END.

If the engine ENG is stopped in a state in which the hydraulic oil cannot be discharged from the electric oil pump EP, the required hydraulic oil cannot be supplied. Therefore, in the present embodiment, when it is determined that the abnormality flag is ON, that is, when it is determined that the operating state of the electric oil pump EP is in the abnormal region S, the coast stop control is not executed. As a result, even when the vehicle 100 is coasting, the hydraulic oil required by the hydraulic pressure control circuit 1 can be supplied. As a result, it is possible to reliably execute the low returning or the like.

The configuration, action, and effect of the embodiment of the present invention configured as described above will be collectively described.

(1), (4), and (7) The vehicle 100 includes the transmission TM which includes the mechanical oil pump MP (first oil pump) driven by the rotation of the engine ENG (drive source) driving the drive wheels DW, and the electric oil pump EP (second oil pump) driven by the motor M. When executing automatic downshift control for automatically downshifting a speed ratio of the transmission TM in the case where the drive current value Im of the motor M obtained when the electric oil pump EP (second oil pump) is driven is larger than the maximum value Imax of the drive current value Im of the motor M obtained when the electric oil pump EP (second oil pump) is driven in a normal drive state, the controller 2 (control device) that controls the vehicle 100 increases the minimum rotation speed Vemin of the engine ENG (drive source) compared to a case where the drive current value Im of the motor M is equal to or less than the maximum value Imax, and when the automatic downshift control is executed in the case where the line pressure PL generated by a hydraulic pressure supplied from the mechanical oil pump MP (first oil pump) and the electric oil pump EP (second oil pump) is larger than the predetermined value PL1, the controller 2 does not increase the minimum rotation speed Vemin of the drive source (engine ENG) even in the case where the drive current value Im of the motor M obtained when the electric oil pump EP (second oil pump) is driven is larger than the maximum value Imax.

In the case where the line pressure PL is larger than the predetermined value PL1, hydraulic oil cannot be supplied from the electric oil pump EP even when the electric oil pump EP (second oil pump) is driven. In this situation, it is just that the electric oil pump EP cannot be driven, and it does not mean that the electric oil pump EP has failed. Therefore, when the line pressure PL is larger than the predetermined value PL1, an abnormality diagnosis of the electric oil pump EP is not performed. As a result, it is possible to prevent unnecessary determination that an abnormality has occurred in the electric oil pump EP. Thus, it is possible to prevent erroneous determination related to abnormality determination of the electric oil pump EP, and thus it is possible to prevent deterioration of fuel consumption. In the case where the electric oil pump EP has failed, the minimum rotation speed Vemin of the engine ENG is increased by a predetermined rotation speed when the automatic downshift control is executed. As a result, when the engine ENG is rotating at the minimum rotation speed Vemin (for example, idling rotation speed), since a minimum supply flow rate of the mechanical oil pump MP can be increased, a required flow rate of the hydraulic oil can be supplied only by the mechanical oil pump MP even when the electric oil pump EP is stopped. Thus, even when an abnormality occurs in the electric oil pump EP, it is possible to prevent a delay in the downshift and appropriately control the transmission TM.

(2), (5), and (8) The vehicle 100 includes the transmission TM which includes the mechanical oil pump MP (first oil pump) driven by the rotation of the engine ENG (drive source) driving the drive wheels DW, and the electric oil pump EP (second oil pump) driven by the motor M. In the case where the drive current value Im of the motor M obtained when the electric oil pump EP (second oil pump) is driven is larger than the maximum value Imax of the drive current value Im of the motor M obtained when the electric oil pump EP (second oil pump) is driven in the normal drive state, the controller 2 (control device) that controls the vehicle 100 does not execute idle reduction control for automatically stopping the engine ENG (drive source) when the vehicle 100 is stopped, and in the case where the line pressure PL generated by the hydraulic pressure supplied from the mechanical oil pump MP (first oil pump) and the electric oil pump EP (second oil pump) is larger than the predetermined value PL1, the controller 2 executes the idle reduction control even in the case where the drive current value Im of the motor M obtained when the electric oil pump EP (second oil pump) is driven is larger than the maximum value Imax.

In the case where the line pressure PL is larger than the predetermined value PL1, the hydraulic oil cannot be supplied from the electric oil pump EP even when the electric oil pump EP (second oil pump) is driven. In this situation, it is just that the electric oil pump EP cannot be driven, and it does not mean that the electric oil pump EP has failed. Therefore, when the line pressure PL is larger than the predetermined value PL1, the abnormality diagnosis of the electric oil pump EP is not performed. As a result, it is possible to prevent unnecessary determination that an abnormality has occurred in the electric oil pump EP. Thus, it is possible to prevent erroneous determination related to the abnormality determination of the electric oil pump EP, and thus it is possible to prevent deterioration of fuel consumption.

When an abnormality occurs in the electric oil pump EP, the idle reduction control is not executed. As a result, when the vehicle 100 is stopped, the required flow rate of the hydraulic oil can be supplied by the mechanical oil pump MP. Thus, even when an abnormality occurs in the electric oil pump EP, the transmission TM can be appropriately controlled.

(3), (6), and (9) The vehicle 100 includes the transmission TM including: the mechanical oil pump MP (first oil pump) driven by the rotation of the engine ENG (drive source) driving the drive wheels DW, and the electric oil pump EP (second oil pump) driven by the motor M. In the case where the drive current value Im of the motor M obtained when the electric oil pump EP (second oil pump) is driven is larger than the maximum value Imax of the drive current value Im of the motor M obtained when the electric oil pump EP (second oil pump) is driven in the normal drive state, the controller 2 (control device) that controls the vehicle 100 automatically stops the engine ENG (drive source) when the vehicle 100 is traveling and does not execute coast stop control for cutting off power transmission between the engine ENG (drive source) and the drive wheels DW, and in the case where the line pressure PL generated by the hydraulic pressure supplied from the mechanical oil pump MP (first oil pump) and the electric oil pump EP (second oil pump) is larger than the predetermined value PL1, the controller 2 executes the coast stop control even in the case where the drive current value Im of the motor M obtained when the electric oil pump EP (second oil pump) is driven is larger than the maximum value Imax.

In the case where the line pressure PL is larger than the predetermined value PL1, the hydraulic oil cannot be supplied from the electric oil pump EP even when the electric oil pump EP (second oil pump) is driven. In this situation, it is just that the electric oil pump EP cannot be driven, and it does not mean that the electric oil pump EP has failed. Therefore, when the line pressure PL is larger than the predetermined value PL1, the abnormality diagnosis of the electric oil pump EP is not performed. As a result, it is possible to prevent unnecessary determination that an abnormality has occurred in the electric oil pump EP. Thus, it is possible to prevent erroneous determination related to the abnormality determination of the electric oil pump EP, and thus it is possible to prevent deterioration of fuel consumption.

When an abnormality occurs in the electric oil pump EP, the coast stop control is not executed. As a result, when the vehicle 100 is stopped, the required flow rate of the hydraulic oil can be supplied by the mechanical oil pump MP. Thus, even when an abnormality occurs in the electric oil pump EP, the transmission TM can be appropriately controlled.

Although the embodiments of the present invention are described above, the above embodiments are merely a part of application examples of the present invention, and do not mean that the technical scope of the present invention is limited to the specific configurations of the above embodiments.

The engine ENG may be a diesel engine.

In the above embodiment, a vehicle capable of executing all of the automatic downshift control, the kick-down control, the idle reduction control, and the coast stop control has been described as an example.

The transmission TM is not limited to a continuously variable transmission, and may be a stepped transmission.

DESCRIPTION OF REFERENCE SIGNS 100 vehicle
1 hydraulic pressure control circuit
2 controller (control device)
ENG engine (drive source)
DW drive wheel
M motor
TM transmission
MP electric oil pump (first oil pump)
EP mechanical oil pump (second oil pump)

The present application claims a priority of Japanese Patent Application No. 2021-035859 filed with the Japan Patent Office on Mar. 5, 2021, all the contents of which are hereby incorporated by reference.

The invention claimed is:

1. A vehicle control device for controlling a vehicle including a transmission, the transmission including a first oil pump driven by rotation of a drive source that drives a drive wheel, and a second oil pump driven by a motor, wherein
when automatic downshift control for automatically downshifting a speed ratio of the transmission is executed in the case where a drive current value of the motor obtained when the second oil pump is driven is larger than a maximum value of the drive current value of the motor obtained when the second oil pump is driven in a normal drive state, the vehicle control device increases a minimum rotation speed of the drive source compared to a case where the drive current value of the motor is equal to or less than the maximum value, and
when the automatic downshift control is executed in the case where a line pressure generated by a hydraulic pressure supplied from the first oil pump and the second oil pump is larger than a predetermined value, the vehicle control device does not increase the minimum rotation speed of the drive source even in the case where the drive current value of the motor obtained when the second oil pump is driven is larger than the maximum value.

2. A vehicle control device for controlling a vehicle including a transmission, the transmission including a first oil pump driven by rotation of a drive source that drives a drive wheel, and a second oil pump provided with a check valve on a suction side and driven by a motor, wherein
in the case where a drive current value of the motor obtained when the second oil pump is driven is larger than a maximum value of the drive current value of the motor obtained when the second oil pump is driven in a normal drive state, the vehicle control device does not execute idle reduction control for automatically stopping the drive source when the vehicle is stopped, and
in the case where a line pressure generated by a hydraulic pressure supplied from the first oil pump and the second oil pump is larger than a predetermined value, the vehicle control device executes the idle reduction control even in the case where the drive current value of the motor obtained when the second oil pump is driven is larger than the maximum value.

3. A vehicle control device for controlling a vehicle including a transmission, the transmission including a first oil pump driven by rotation of a drive source that drives a drive wheel, and a second oil pump provided with a check valve on a suction side and driven by a motor, wherein
in the case where a drive current value of the motor obtained when the second oil pump is driven is larger than a maximum value of the drive current value of the motor obtained when the second oil pump is driven in a normal drive state, the vehicle control device does not execute coast stop control for automatically stopping the drive source when the vehicle is traveling and for cutting off power transmission between the drive source and the drive wheel, and
in the case where a line pressure generated by a hydraulic pressure supplied from the first oil pump and the second oil pump is larger than a predetermined value, the vehicle control device executes the coast stop control even in the case where the drive current value of the motor obtained when the second oil pump is driven is larger than the maximum value.

* * * * *